(12) United States Patent
Wu et al.

(10) Patent No.: US 11,694,819 B1
(45) Date of Patent: Jul. 4, 2023

(54) ELECTROMAGNETIC WAVE-TRAPPING DEVICE

(71) Applicant: MLOptic Corp, Redmond, WA (US)

(72) Inventors: Pengfei Wu, Bellevue, WA (US); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/090,379

(22) Filed: Dec. 28, 2022

(51) Int. Cl.
*G21K 1/00* (2006.01)
*G02B 5/00* (2006.01)

(52) U.S. Cl.
CPC ............... *G21K 1/00* (2013.01); *G02B 5/005* (2013.01)

(58) Field of Classification Search
CPC .................. G21K 1/00; G02B 5/005
See application file for complete search history.

(56) References Cited

PUBLICATIONS

S. I. Woods, J. E. Proctor, T. M. Jung, A. C. Carter, J. Neira, and D. R. Defibaugh, Wideband infrared trap detector based upon doped silicon photocurrent devices, vol. 57, No. 18 / Jun. 20, 2018 / Applied Optics, published Apr. 9, 2018.

*Primary Examiner* — Nicole M Ippolito
*Assistant Examiner* — Hanway Chang
(74) *Attorney, Agent, or Firm* — Tracy Jong Law Firm; Tracy P. Jong; Cheng Ning Jong

(57) ABSTRACT

An electromagnetic wave-trapping device including two surfaces, each disposed in a plane, the two surfaces disposed at a first angle with respect to one another to form an opening, one of the two surfaces is configured to be orientated such that an incident electromagnetic ray through the opening, is disposed at a second angle with respect to the one of the two surfaces.

7 Claims, 12 Drawing Sheets

| detector transmittance | $n_{1d}$ and $n_{1dw}$ with different f | | | | | | |
|---|---|---|---|---|---|---|---|
| | f = 0 | | f = 0.25 | | f = 0.5 | | |
| 1-R | $n_{1dw}$ | $n_{1d}$ | $n_{1dw}$ | $n_{1d}$ | $n_{1dw}$ | $n_{1d}$ | |
| 0.50 | 0.84539 | 0.49900 | 0.75610 | 0.49900 | 0.65705 | 0.49901 | |
| 0.60 | 0.91017 | 0.59877 | 0.84273 | 0.59878 | 0.75178 | 0.59885 | |
| 0.70 | 0.95252 | 0.69853 | 0.90622 | 0.69858 | 0.83710 | 0.69862 | |
| 0.80 | 0.97788 | 0.79825 | 0.94951 | 0.79836 | 0.91713 | 0.79839 | |
| 0.85 | 0.98581 | 0.84819 | 0.96474 | 0.84826 | 0.94232 | 0.84821 | |
| 0.90 | 0.99150 | 0.89811 | 0.97768 | 0.89810 | 0.96418 | 0.89812 | |
| 0.95 | 0.99551 | 0.94800 | 0.98879 | 0.94799 | 0.98218 | 0.94802 | |
| 0.96 | 0.99626 | 0.95794 | 0.99088 | 0.95800 | 0.98558 | 0.95805 | |
| 0.97 | 0.99694 | 0.96791 | 0.99282 | 0.96794 | 0.98897 | 0.96803 | |
| 0.98 | 0.99746 | 0.97795 | 0.99483 | 0.97791 | 0.99224 | 0.97794 | |
| 0.99 | 0.99810 | 0.98798 | 0.99680 | 0.98793 | 0.99543 | 0.98798 | |

FIG. 7

$\eta_{2d}$ and $\eta_{2dw}$ with different f

| detector transmittance | f = 0 | | f = 0.25 | | f = 0.5 | |
|---|---|---|---|---|---|---|
| 1 - R | $\eta_{2dw}$ | $\eta_{2d}$ | $\eta_{2dw}$ | $\eta_{2d}$ | $\eta_{2dw}$ | $\eta_{2d}$ |
| 0.50 | 0.97157 | 0.96850 | 0.79900 | 0.80008 | 0.66768 | 0.66774 |
| 0.60 | 0.99015 | 0.98735 | 0.86002 | 0.86053 | 0.75344 | 0.75461 |
| 0.70 | 0.99689 | 0.99446 | 0.91041 | 0.91336 | 0.82798 | 0.82933 |
| 0.80 | 0.99880 | 0.99673 | 0.96302 | 0.96897 | 0.90824 | 0.92140 |
| 0.85 | 0.99912 | 0.99713 | 0.98635 | 0.98313 | 0.94432 | 0.95276 |
| 0.90 | 0.99921 | 0.99749 | 0.99172 | 0.98895 | 0.98375 | 0.98043 |
| 0.95 | 0.99932 | 0.99766 | 0.99586 | 0.99366 | 0.99253 | 0.98981 |
| 0.96 | 0.99931 | 0.99773 | 0.99661 | 0.99465 | 0.99399 | 0.99147 |
| 0.97 | 0.99932 | 0.99777 | 0.99731 | 0.99550 | 0.99530 | 0.99317 |
| 0.98 | 0.99932 | 0.99784 | 0.99797 | 0.99629 | 0.99670 | 0.99483 |
| 0.99 | 0.99935 | 0.99787 | 0.99872 | 0.99711 | 0.99798 | 0.99634 |

FIG. 9

| detector transmittance | $\eta_{2dwa}$ and $\eta_{2d}$ with different f | | | | | |
|---|---|---|---|---|---|---|
| | f = 0 | | f = 0.25 | | f = 0.5 | |
| 1 - R | $\eta_{2dwa}$ | $\eta_{2d}$ | $\eta_{2dwa}$ | $\eta_{2d}$ | $\eta_{2dwa}$ | $\eta_{2d}$ |
| 0.50 | 0.99027 | 0.96850 | 0.79935 | 0.80008 | 0.66742 | 0.66774 |
| 0.60 | 0.99711 | 0.98735 | 0.85835 | 0.86053 | 0.75207 | 0.75461 |
| 0.70 | 0.99913 | 0.99446 | 0.90570 | 0.91336 | 0.82555 | 0.82933 |
| 0.80 | 0.99948 | 0.99673 | 0.94727 | 0.96897 | 0.89498 | 0.92140 |
| 0.85 | 0.99951 | 0.99713 | 0.97786 | 0.98313 | 0.93093 | 0.95276 |
| 0.90 | 0.99954 | 0.99749 | 0.98994 | 0.98895 | 0.97616 | 0.98043 |
| 0.95 | 0.99952 | 0.99766 | 0.99830 | 0.99366 | 0.99708 | 0.98981 |
| 0.96 | 0.99955 | 0.99773 | 0.99854 | 0.99465 | 0.99762 | 0.99147 |
| 0.97 | 0.99949 | 0.99777 | 0.99880 | 0.99550 | 0.99804 | 0.99317 |
| 0.98 | 0.99949 | 0.99784 | 0.99900 | 0.99629 | 0.99856 | 0.99483 |
| 0.99 | 0.99953 | 0.99787 | 0.99929 | 0.99711 | 0.99903 | 0.99634 |

FIG. 12

ELECTROMAGNETIC WAVE-TRAPPING DEVICE

BACKGROUND OF THE INVENTION

1. The Field of the Invention

The present invention relates to an electromagnetic wave-trapping device. More specifically, the present invention is directed to a highly efficient electromagnetic wave-trapping device, e.g., a highly efficient light-trapping device.

2. Background Art

Electromagnetic wave collection or trapping across a wide spectral band is critical for many applications, e.g., in photodetection, where photon-electron conversion is increased, thus enabling high quantum efficiency. For instance, with solar cells, light of broad spectral bands is collected with high collection efficiency to improve photocurrent generation in solar collection systems. For imaging applications, lens arrays of focal plane arrays, e.g., charge coupled device (CCD) and complementary metal-oxide semiconductor (CMOS) sensors, are used to increase collection efficiency. In applications where natural lighting is important, sunlight is naturally collected and guided inside buildings to reduce artificial lighting requirements and thus saving energy. High efficiency light trapping is also important for the coherent absorption effect in all optical data detection and processing to allow an optical signal to be strongly modulated by another coherent optical signal without the need for material nonlinearity. In microwave, radio wave or radar applications where high-efficiency collection is required, i.e., electromagnetic wave trapping with less reflection is critical. In nondestructive measurements, useful techniques for measuring material absorptivity and other sample characteristics may be provided with light-trapping. In some applications, anti-reflection coatings are used to enhance light transmittance so that more light reaches detection areas. However, if light is not 100% absorbed, any scattered or reflected light will escape from detection due to the law of reversibility of light. Nanostructures, e.g., a black silicon photodiode consisting of a surface nanostructure, etc., are sometimes used to maximize light absorption and minimize surface recombination. An external quantum efficiency of about 96% has been achieved over the wavelength range from about 250 nm to 950 nm. In some instances, light rays may be coupled into optical cavities or any geometric structures with reflective surfaces or diffusing surfaces, e.g., integrating spheres where the coupling efficiencies are normally below about 90%. For reducing light leakages in integrating sphere-like devices, the port fraction must be small, i.e., the aperture must be small. Coherent perfect absorption can be obtained by controlling photoexcitation in periodic nanostructures, e.g., meta surfaces, nanopyramid arrays, gratings, complex multiport cavities and guided mode structures. Although the collection efficiency associated with such equipment is respectable, further improvements are necessary to increase the coupling or collection efficiency to be close to 100%. Further, improvements of photodetectors via micro and/or nanotexturing are usually counterbalanced by an increase of surface recombination, resulting in external quantum efficiency far from one. Further, high costs and difficulty of manufacturing nanostructures in large volume impact the widespread adoption of nanostructures for use in light collection. Yet further, environmental changes, e.g., temperature changes, may also have an impact on the functionality of nanostructures especially for coherent methods. Yet further, the limited bandwidth for light collection and absorption further limits the use of conventional methods disclosed elsewhere herein in efforts to improve light collection.

There exists a need for an electromagnetic, e.g., light or other electromagnetic wave collection or trapping device capable of approaching 100% efficiency in its function as a collecting or trapping device.

SUMMARY OF THE INVENTION

In accordance with the present invention, there is provided an electromagnetic wave-trapping device including:
(a) a pair of spaced-apart first walls disposed substantially in parallel format, each of the first walls including a front end and a rear end;
(b) a second wall extending from the rear end of a first of the pair of first walls at a first lateral angle with respect to the first of the pair of first walls between the pair of first walls; and
(c) a third wall extending from the rear end of a second of the pair of first walls at a second lateral angle with respect to the second of the pair of first walls between the pair of first walls,
wherein electromagnetic rays are received at least in one of a space between the second wall and the first of the pair of first walls and a space between the third wall and the second of the pair of first walls.

In one embodiment, the first lateral angle is the same as the second lateral angle. In one embodiment, each of the pair of first walls, the second wall and the third wall can be coated with aluminum, silver, copper, gold, dielectric materials, any reflective coatings or any combinations thereof. In one embodiment, each of the pair of first walls, the second wall and the third wall is flat. In one embodiment, the incident electromagnetic ray can be radio waves, microwaves, infrared light, visible light, ultraviolet light or X-rays. In one embodiment, the electromagnetic wave-trapping device further includes at least one electromagnetic wave detector disposed on one of the pair of first walls, the second wall and the third wall for detecting at least a portion of the incident electromagnetic ray. In one embodiment, the electromagnetic wave-trapping device further includes a circular aperture configured to be placed in front of the front end of the pair of first walls to affect the incident electromagnetic ray.

An object of the present invention is to provide an electromagnetic wave-trapping device.

Another object of the present invention is to provide an electromagnetic wave-trapping device capable of a detection efficiency of close to 100%.

Another object of the present invention is to provide an electromagnetic wave-trapping device that is low cost and simple in its construction while capable of a detection efficiency of close to 100%.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 is a table depicting detection efficiencies of an electromagnetic wave-trapping device having one detector.

FIG. 9 is a table depicting detection efficiencies of an electromagnetic wave-trapping device having two detectors.

FIG. 12 is a table depicting detection efficiencies of an electromagnetic wave-trapping device having two detectors and with a circular aperture placed in front of an opening of the device to optically affect the electromagnetic wave-trapping device.

PARTS LIST

Figure 1:
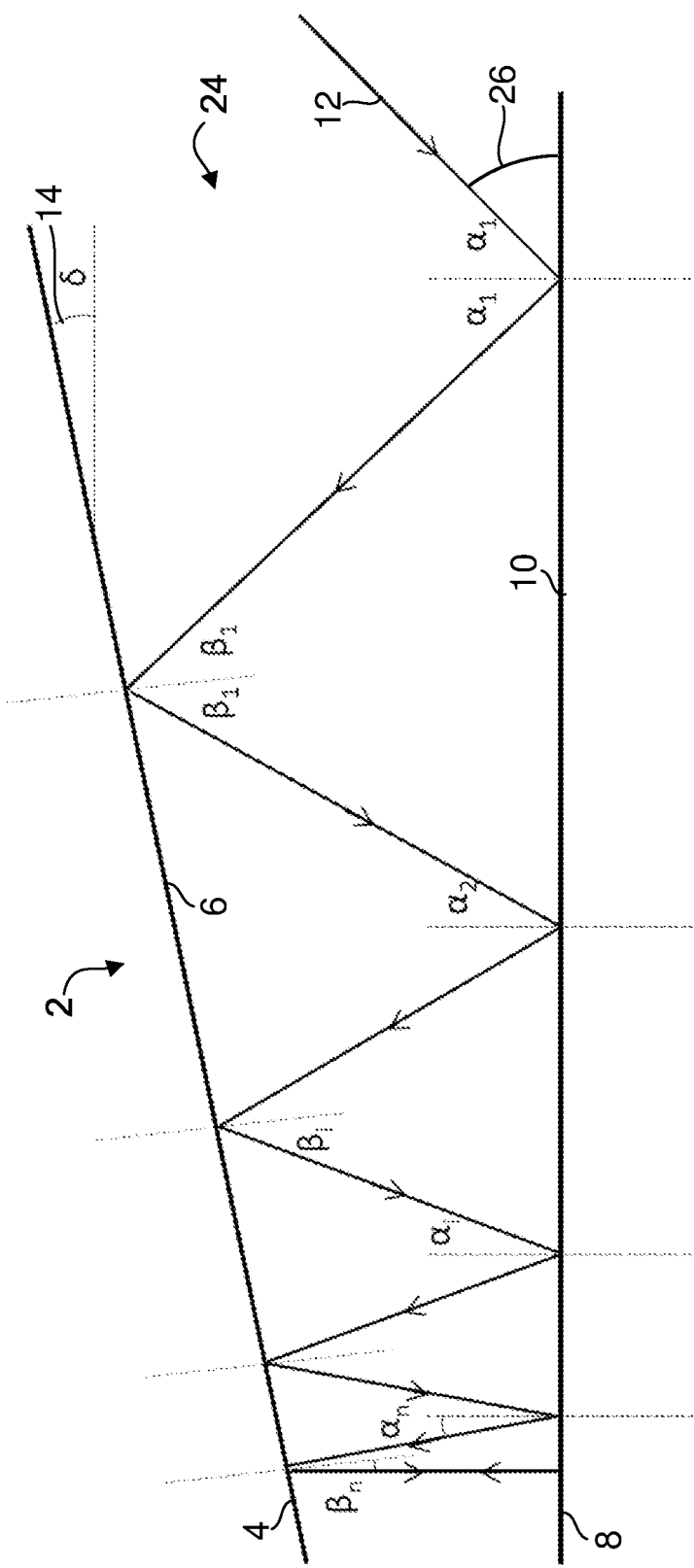
FIG. 1 depicts one embodiment of an electromagnetic wave-trapping device.

2—electromagnetic wave-trapping device
4—substrate
6—surface
8—substrate
10—surface
12—incident electromagnetic wave
14—angle between converging surfaces
16—escaping electromagnetic wave
18—electromagnetic wave, e.g., light rays
20—detector
22—trapped electromagnetic wave
24—opening
26—angle of incident electromagnetic wave with respect to a surface
28—side wall
30—first lateral angle
32—second lateral angle
34—front end of wall
36—rear end of wall
38—aperture

PARTICULAR ADVANTAGES OF THE INVENTION

The present device can further improve sensor sensitivities in collecting light and reduce the cost for light collection. It is well known that light rays are always partially reflected when hitting any interfaces, including detector surfaces, even with anti-reflective coatings. The best broadband anti-reflective coatings are about 95% efficient for visible band. Recent studies also show that the detector can reach a light collection efficiency of about 96%. In some special cases, efficiencies of about 99% have been reported for devices utilizing optical fibers and efficiency of over about 130% are also reported at 200 nm wavelength due to the carrier multiplication process. However, these results are different from the present concept that focuses on further improvement of the light detection efficiency based on any available detectors. In addition, light detection works in a very broad band covering from ultraviolet (UV), visible to infrared light. The present concept and design also work for high efficiency detections in other electromagnetic wave bands by using proper materials to fabricate the collectors.

The present device is based on several concepts including the concept of increasing the probability that the rays hit the detector surface as much as possible, reducing the idle bouncing of light rays that no detector surface is involved, increasing entropy to break the law of reversibility of light and providing a geometric structure enabling it to trap light rays efficiently while maintaining a relatively large entrance aperture.

The present device produces near 100% collection efficiency while allowing broad band collections and collections of any electromagnetic wave bands. As the opening or entrance aperture for each collector is large, a single detector assembly is sufficient in collecting light rays near 100% collection efficiency. For the same reason, each collector includes a large fill factor and high spatial resolution for an imaging sensor application. The present device can be suitably sized according to the sensor size, number of sensors and applications. The present device is environmentally stable and robust, unlike prior collectors modified with nanostructures. Further, the very structure of the present device provides additional protection to avoid damage to the detector disposed therein. As the present device is uncomplicated in its design, the design lends itself to the ease of fabrication, and thus low costs.

In one embodiment, the electromagnetic wave-trapping units are configured in a manner which lends itself to mass manufacturing, e.g., all the walls of the device are formable by front and rear molds and presses in a single pass.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
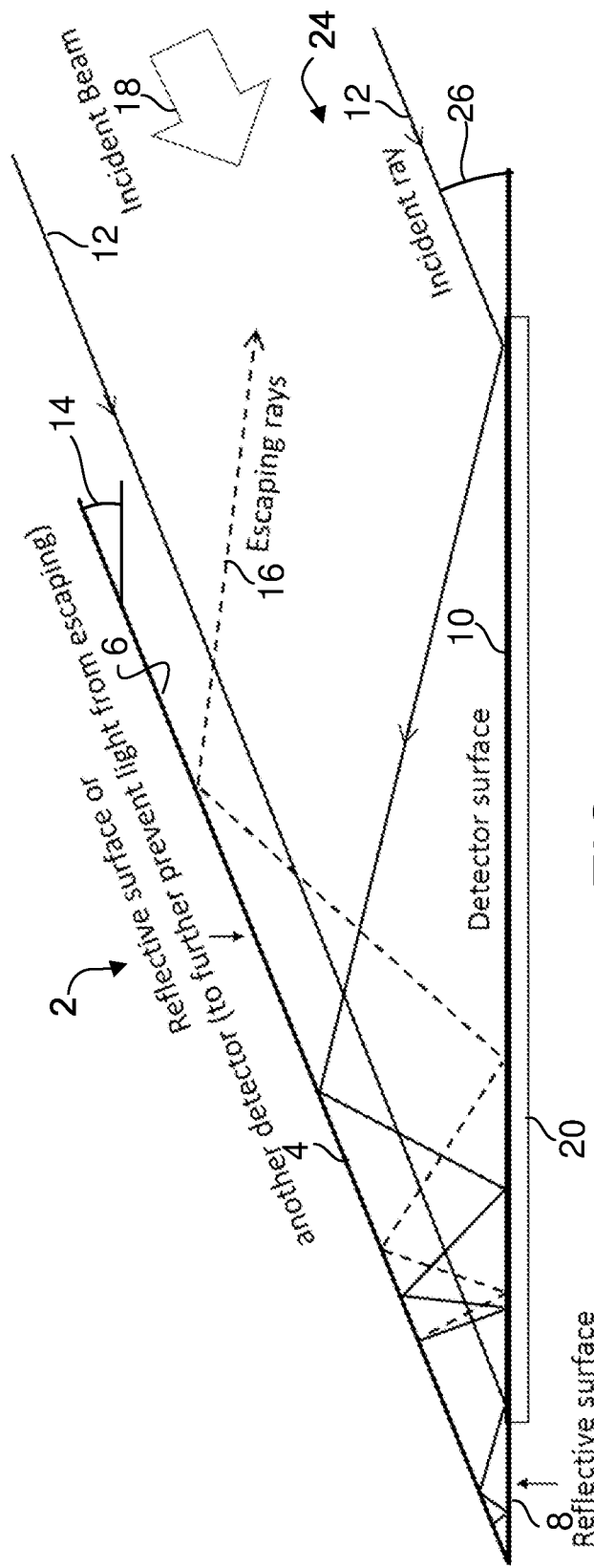
FIG. 2 depicts one embodiment of an electromagnetic wave-trapping device, showing escaping waves due to the incident electromagnetic waves incident upon one of the surfaces of the device at a particular angle.

FIG. 1 depicts one embodiment of an electromagnetic wave-trapping device 2. FIG. 2 depicts one embodiment of an electromagnetic wave-trapping device 2, showing escaping waves 16 due to the incident electromagnetic waves incident upon one of the surfaces of the device at a particular angle. The electromagnetic wave-trapping device 2 includes two surfaces 6, 10, each disposed in a plane, the two surfaces 6, 10 disposed at a first angle 14 with respect to one another to form an opening 24, one of the two surfaces 6, 10 is configured to be orientated such that an incident electromagnetic ray 12 through the opening 24, is disposed at a second angle 26 with respect to one of the two surfaces 6, 10. Each substrate 4, 8 supports a surface 6, 10 or a detector 20. In the embodiments shown in FIGS. 1 and 2, each of the two surfaces is flat. Although the present device is demonstrated to be useful for visible light herein, it shall function similarly for other electromagnetic waves, e.g., radio waves, microwaves, infrared light, ultraviolet light and X-rays. The light ray bouncing numbers and propagating direction are determined. The first angle 14 can be determined as disclosed elsewhere herein depending on the application the electromagnetic wave-trapping device is designed to accomplish. In one embodiment, the first angle is substantially the same as the second angle to reduce escapes of electromagnetic wave from the device. Based on theories related to a triangle, $\alpha_i = \beta_i + \delta$, $\beta_{i+1} = 2\alpha_i - \beta_i = \beta_i + 2\delta$, where the angles are labelled in FIG. 1. By continuing to apply these formulas to successive angles, $\beta_1 = \beta_n + 2n\delta$ and $\alpha_1 = \beta_n + (2n-1)\delta$ where i, n are any integers and $\delta$ is the first angle or the angle 14 between converging surfaces. When $\alpha_n$ or $\beta_n$ approaches 0, the ray will not propagate further forward but bounce back. Assuming one surface is completely reflective, and another is attached with a detector surface, the light will be attenuated each time when the rays hit the detector surface. The escaping light power ($P_e$) can be estimated by $P_e = P_i * R^{2n}$, where $P_i$ is incident power, n is the averaged times that the light hits the detector surface in one direction and R is the percentage of photons that are not absorbed by the detector but reflected from the detector surface. The detection efficiency ($\eta$) can be calculated using $\eta = (P_i - P_e)/P_i = 1 - R^{2n}$. For example, if R=10% and n=5, the percentage of escaping rays $P_e/P_i$ is extremely small. If both upper and bottom surfaces are attached with the detectors, photons will be further absorbed because n is doubled. In this case, the escaping light can be negligible. The detection efficiency ($\eta$) should be close to unity. In other words, the light rays 22 can be effectively trapped by the structure and efficiently absorbed by the detector. Therefore, as will be seen in the ensuing figures that variant designs will have much more significant applications than single-detector assemblies.

Figure 3:
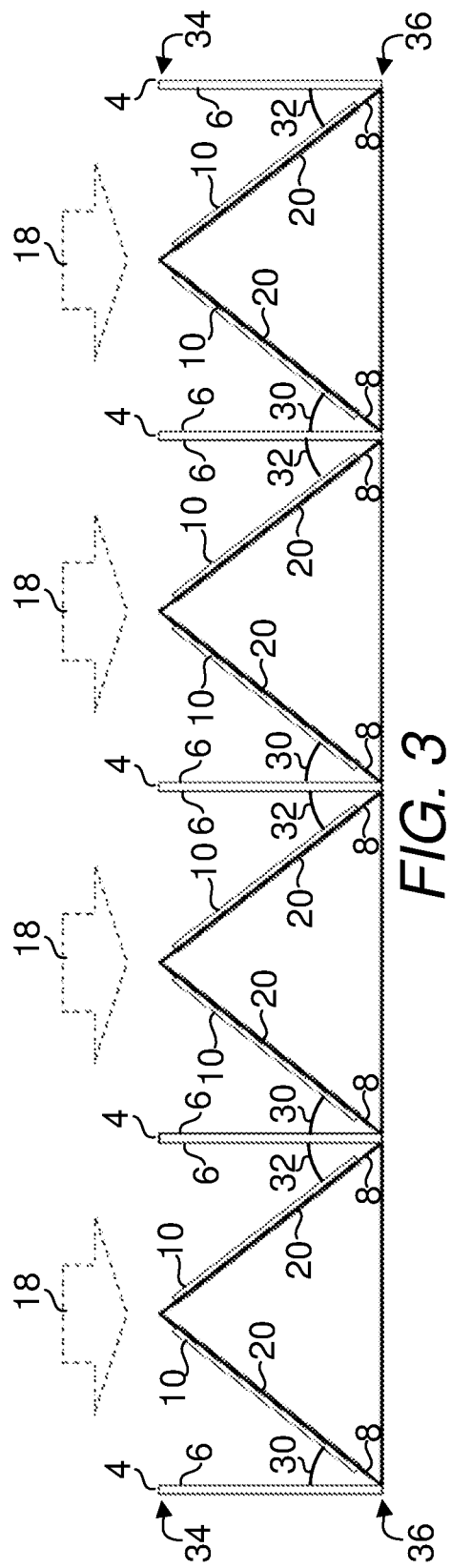
FIG. 3 depicts one embodiment of an electromagnetic wave-trapping device.
Figure 4:
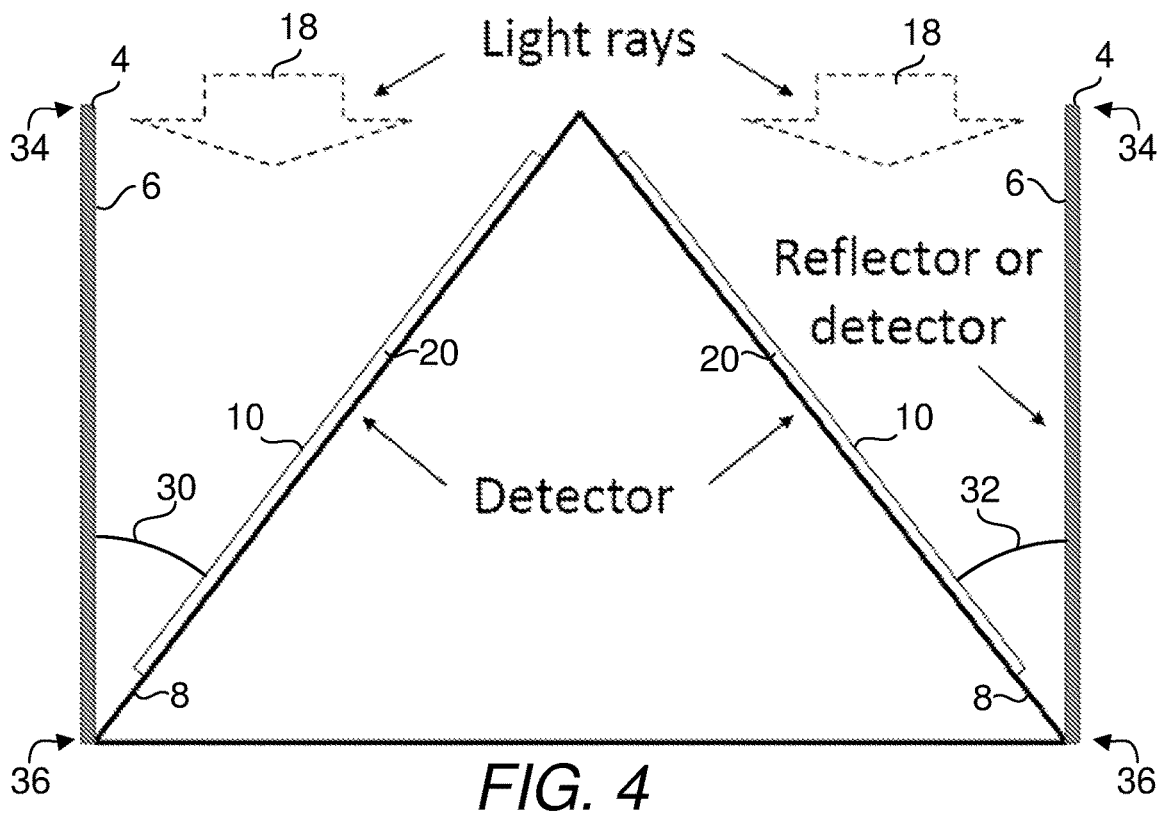
FIG. 4 depicts one unit of the embodiment of an electromagnetic wave-trapping device of FIG. 3.

FIG. 3 depicts one embodiment of an electromagnetic wave-trapping device. FIG. 4 depicts one unit of the embodiment of an electromagnetic wave-trapping device of FIG. 3. FIG. 3 shows a combined array design which can extensively enlarge the aperture for light collection without increasing the thickness. Essentially, only four units are shown in FIG. 3. However, in an industrial scale application, e.g., in a solar power generation application, there may be millions of such units all disposed in a single layer shown in FIG. 3. Further, it shall be appreciated that as the units are configured in a manner which lends itself to mass manufacturing, e.g., all the walls are formable by front and rear molds and presses in a single pass. The design can be a 1-dimensional linear array, 2-dimensional plane array, 1-dimensional curved array or any 2-dimensional, 3-dimensional shapes of combined arrays, depending on the light distribution, beam spread, or specific applications. For instance, the present device can be used for solar collection for power generation or solar collection for signalling, etc. Focal plane arrays, e.g., charge coupled devices (CCD) and complementary metal-oxide semiconductor (CMOS) sensors for imaging applications are currently used in the industry to increase collection efficiency. Two or more detectors are used with each unit for light trapping and detection. Referring to FIG. 3, light rays 18 can be incident to a present device at right angle to the present device. As such, for each unit of the present device, the overall entrance aperture is also doubled. It shall be noted that, each unit of the electromagnetic wave-trapping device includes a pair of spaced-apart first walls 4, a second wall 8 and a third wall 8. The pair of spaced-apart first walls 4 are disposed substantially in parallel format, each first wall including a front end 34 and a rear end 36. The second wall 8 extends from the rear end 36 of a first of the pair of first walls 4 at a first lateral angle 30 with respect to the first of the pair of first walls 4 between the pair of first walls 4. The third wall 32 extends from the rear end 36 of a second of the pair of first walls 4 at a second lateral angle 32 with respect to the second of the pair of first walls 4 between the pair of first walls 4. Electromagnetic rays 18 are received at least in one of a space between the second wall 8 and the first of the pair of first walls 4 and a space between the third wall 8 and the second of the pair of first walls 4. For increased detection of electromagnetic rays, the electromagnetic wave-trapping device can include multiple units of such arrangement of the first walls 4, second wall 8 and third wall 8. In the embodiment shown in FIGS. 3 and 4, the first lateral angle 30 is substantially the same as the second lateral angle 32 although it is conceivable to provide second and third walls 8 that are disposed at different lateral angles. Again, each of the pair of first walls 4, the second wall 8 and the third wall 8 is configured can be coated with aluminum, silver, copper, gold, dielectric materials, any reflective coatings or any combinations thereof. Again, in a preferred embodiment, each of the pair of first walls 4, the second wall 8 and the third wall 8 is flat. Again, at least one electromagnetic wave detector can be disposed on one of the pair of first walls 4, the second wall 8 and the third wall 8 for detecting at least a portion of the incident electromagnetic ray. Again, the electromagnetic wave-trapping device can include a circular aperture configured to be placed in front of the front end of the pair of first walls to affect the incident electromagnetic ray.

Figure 5:
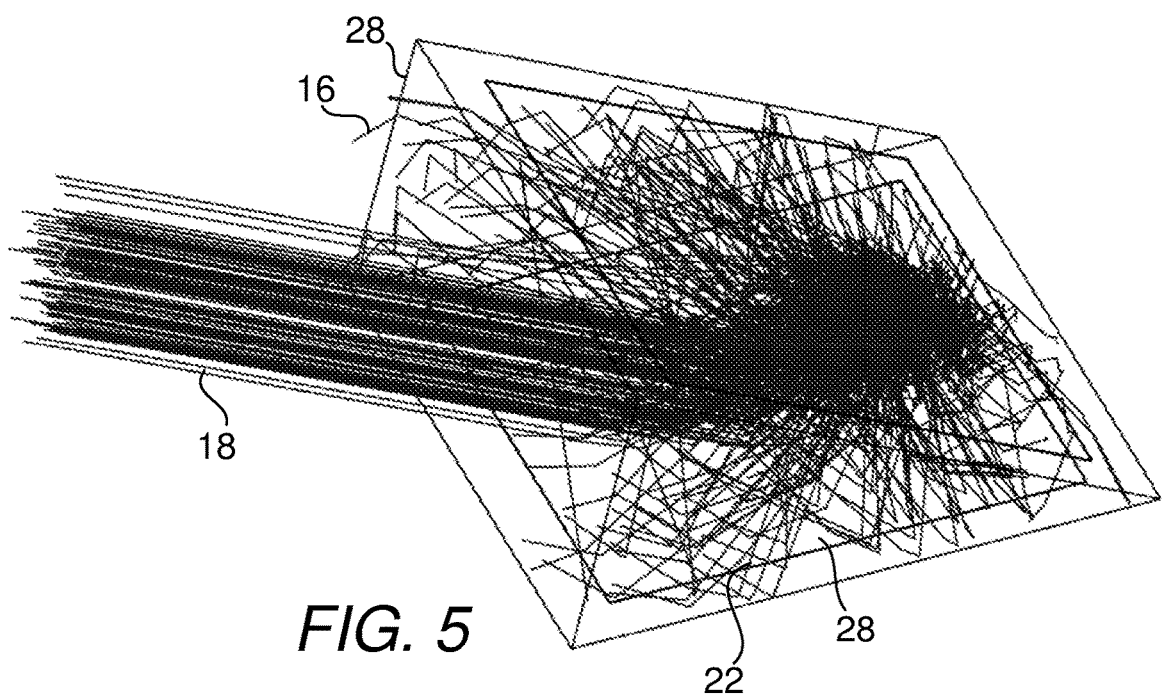
FIG. 5 is a top front perspective partially transparent view of one embodiment of an electromagnetic wave-trapping device.
Figure 6:
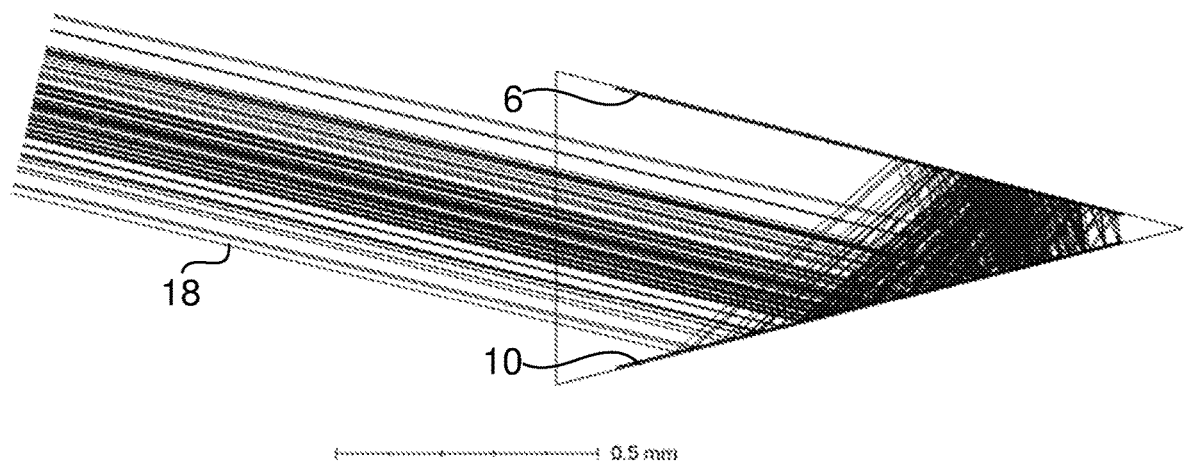
FIG. 6 is a side view of the embodiment of the electromagnetic wave-trapping device of FIG. 5.

FIG. 5 is a top front perspective partially transparent view of one embodiment of an electromagnetic wave-trapping device. FIG. 6 is a side view of the embodiment of the electromagnetic wave-trapping device of FIG. 5. In order to verify the effectiveness of the present device in light collection, simulations using ZEMAX® for have been performed and their results are shown in the ensuing figures.

As an example, the simulation here covers ultraviolet (UV), visible and infrared (IR) (from 200 nm to 2000 nm). The detector size is 1 mm×1 mm although other sizes can be used as well. The simulations can easily be extended to other electromagnetic wave bands with similar design and results. Referring back to FIGS. 5 and 6, light beams are incident to the bottom detector from the front rectangular opening of the wedge-shaped structure. The incident direction is near parallel to the upper surface. As used herein, a wedge angle 14 is used to reference an angle between the two converging surfaces 6, 10 where the planes in which the two converging surfaces lie appear as lines two-dimensionally. A wedge-shaped structure, on the other hand, represents a device having a cross-sectional profile of a hollow wedge and bounded on each end by a wall 28 which prevents or reduces leakage of waves or rays that would have otherwise occurred through the planes along which the walls 28 are disposed. It shall also be noted that, as shown in FIG. 1, the surfaces 6, 10 need not be connected at the end of the device where the surfaces 6, 10 converge as the targeted rays for collection do not travel beyond the converged end of the surfaces 6, 10.

Figure 8:
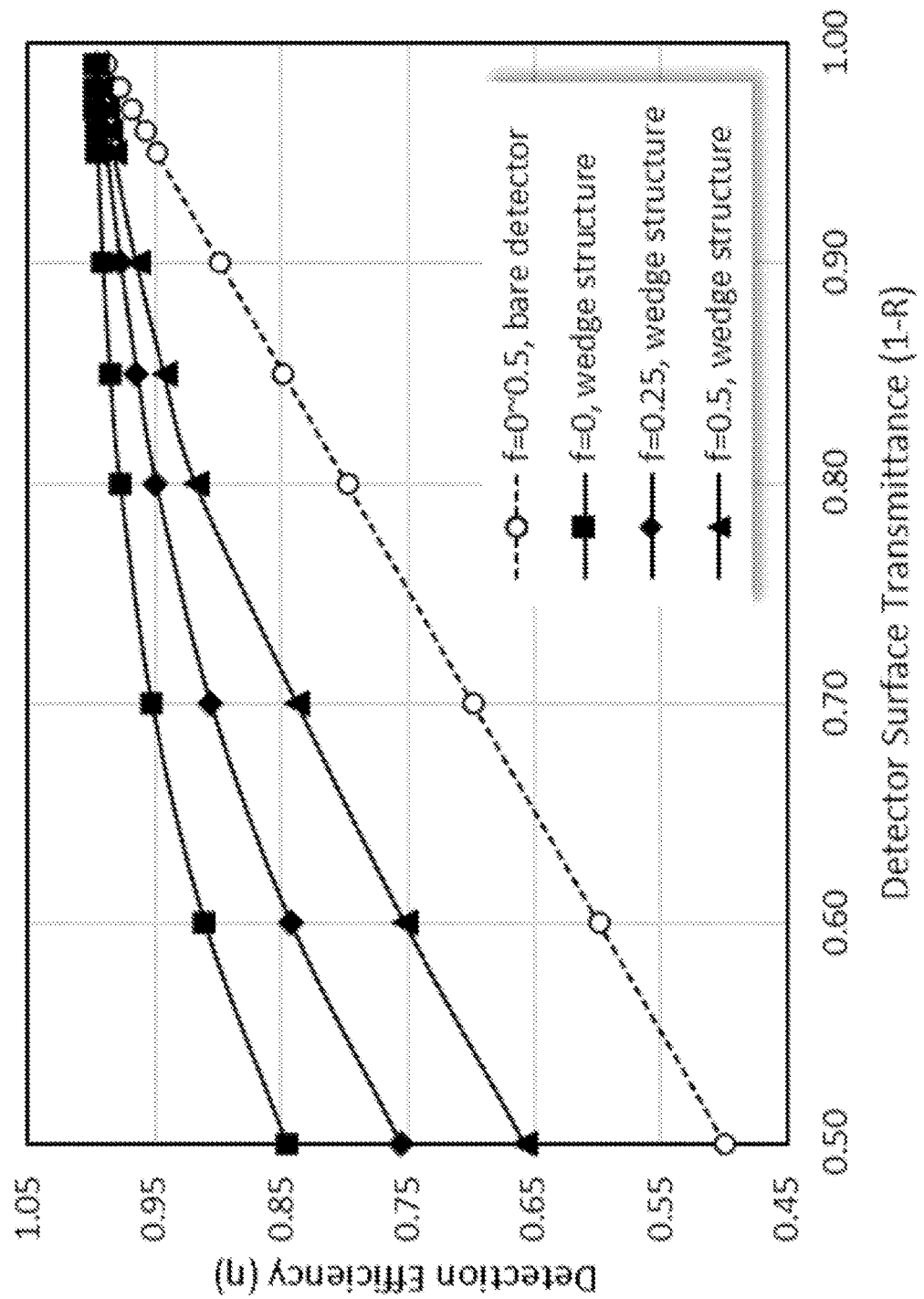
FIG. 8 is a graph depicting detection efficiencies of an electromagnetic wave-trapping device having one detector.

FIG. 7 is a table depicting detection efficiencies of an electromagnetic wave-trapping device having one detector. One detector is attached to one of the surfaces of a wedge shown elsewhere herein. FIG. 8 is a graph depicting detection efficiencies of an electromagnetic wave-trapping device having one detector. For single detector simulations, internal faces of the device are coated with a thick layer of Aluminum or other materials which enhance reflections and cause no absorption, except for the front opening or aperture and detector area. Other coating materials include, but not limited to, copper, gold, dielectric materials, any reflective coatings and any combinations thereof. In some instances, the selection of a coating is dependent upon the electromagnetic wave spectral bands. In other instances, some dielectric materials, e.g., polytetrafluoroethylene (PTFE) which have near zero absorption in visible spectral band, can also be used. The results are compared to those of a bare detector without the wedge-shaped structure of the present device. Simulation results with one detector are as shown in FIGS. 7 and 8 with R being the detector surface reflection, $\eta_{1d}$ being the detection efficiency using one bare detector without light trapping structure, maw being the detection efficiency using one detector attached to one of the surfaces of a wedge-shaped structure shown elsewhere herein and f being the scatter fraction of the detector surface using scatter model of Lambertian. For one bare detector, light rays reflected (bouncing number n=1) from the surface escape directly from detection, so the detection efficiency $\eta_{1d}$ is close to 1−R. However, with a wedge-shaped structure, any undetected rays can be further trapped and then re-detected by the detector. Based on the simulation, the detection efficiency maw is obviously improved (with higher detection efficiencies) depending on the detector reflection and scattering.

Figure 10:
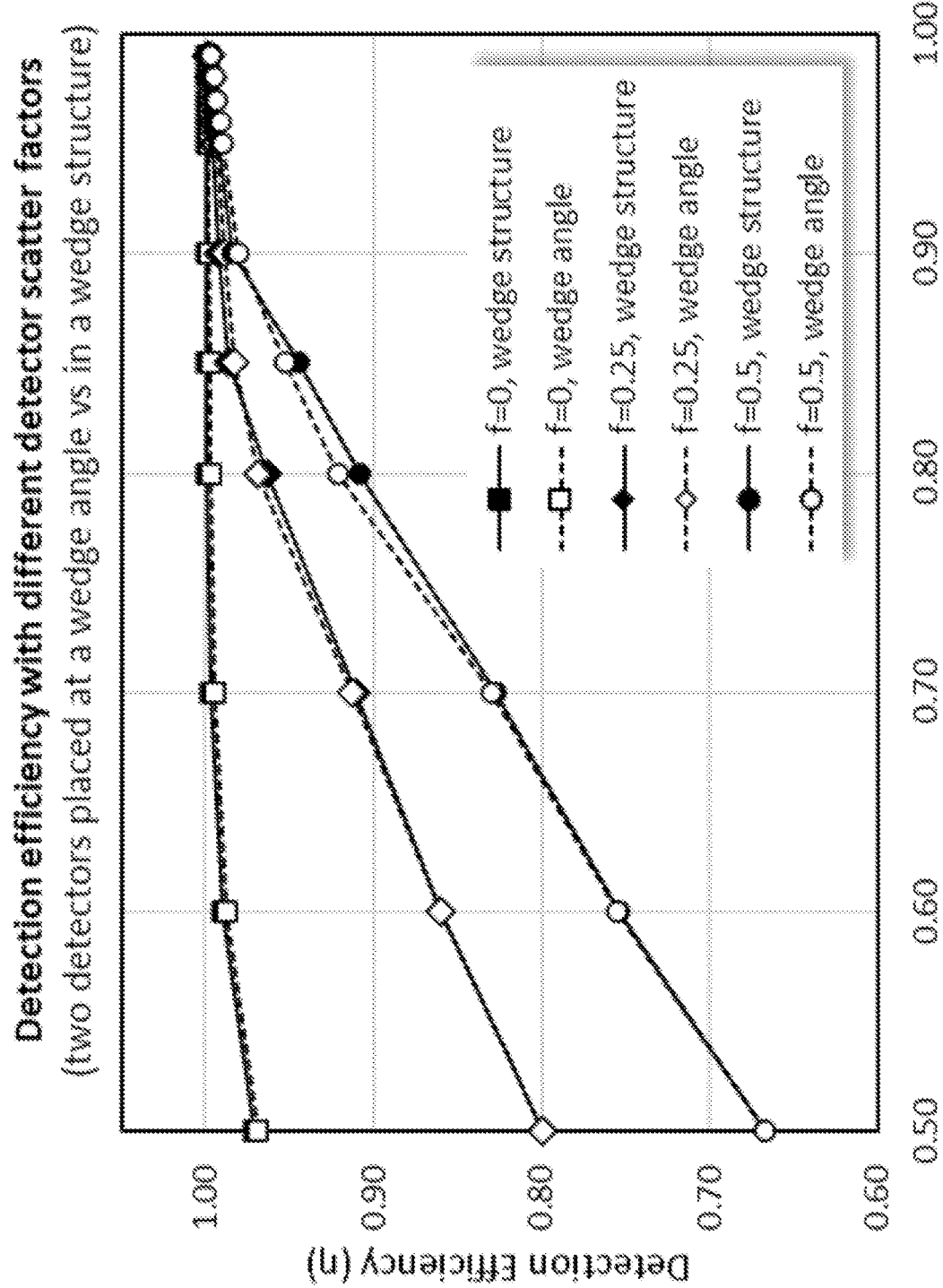
FIG. 10 is a graph depicting detection efficiencies of an electromagnetic wave-trapping device having two detectors.

FIG. 9 is a table depicting detection efficiencies of an electromagnetic wave-trapping device having two detectors. FIG. 10 is a graph depicting detection efficiencies of an electromagnetic wave-trapping device having two detectors. Compared to the single detector configured, here, another detector is attached on the second surface of a wedge shape structure shown elsewhere herein, as well. For a two-detector configuration, a simulation is conducted using a similar wedge-shaped structure with Aluminum coatings, and the other simulation is conducted using two bare detectors placed at the same wedge angle but without a wedge-shaped structure and coatings. In addition to light reflections by one or more detector surfaces, a ZEMAX® simulation also considers scattering effects of the detector surfaces for better approximating the actual applications especially for recent detector technology with nanostructured surfaces. Referring to FIGS. 9 and 10, two detectors are used where one is attached to the upper surface and the other the bottom surface of a wedge-shaped structure or placed at the same wedge angle. Simulation results with two detectors are shown in FIGS. 9 and 10 with $\eta_{2d}$ being the detection efficiency using two bare detectors placed at a wedge angle, $\eta_{dw}$ being the detection efficiency using two detectors attached in a wedge-shaped structure and f being the scatter fraction of a detector surface using the scatter model of Lambertian. It shall be noted that, the detection efficiency is further improved by using a two-detector design as the detection efficiency improves compared to a single detector structure. The detection efficiency increases quickly up to near unity even with detectors that only have 60% transmittance. The results are similar for two detectors either at a wedge angle or in a wedge-shaped structure.

Figure 11:
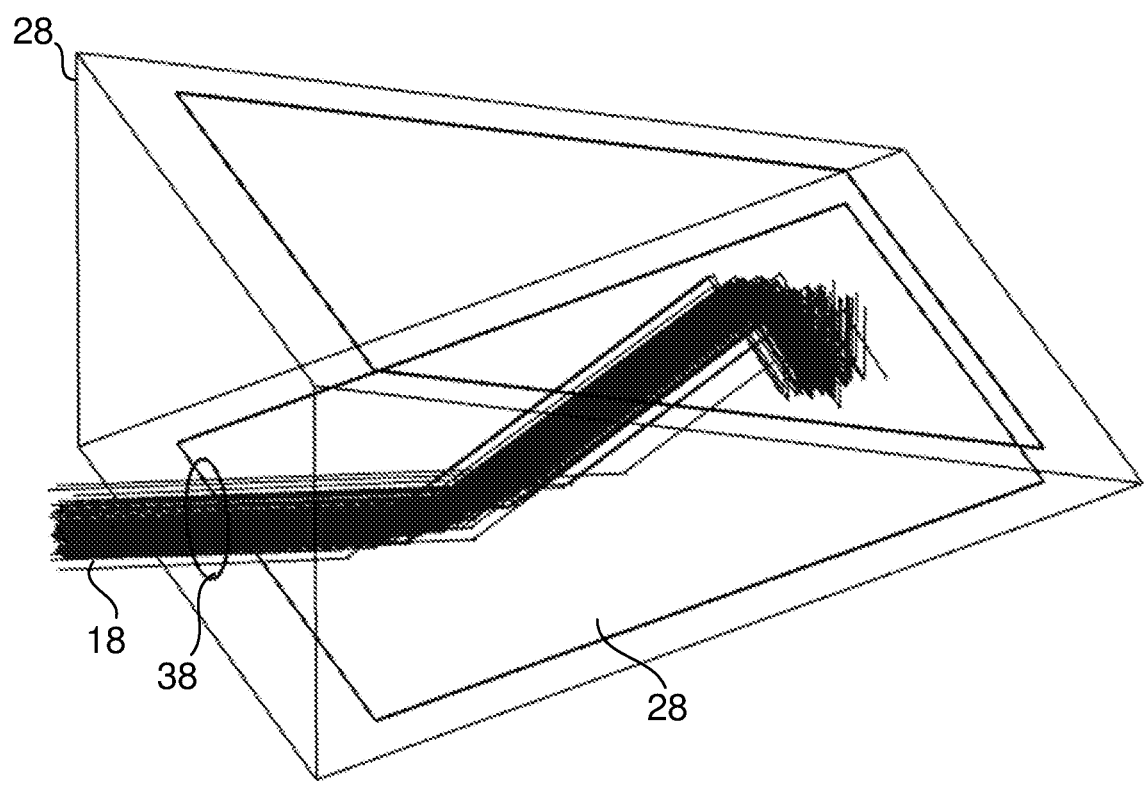
FIG. 11 depicts an electromagnetic wave-trapping device including a circular aperture placed in front of the opening to affect the incident electromagnetic ray.
Figure 13:
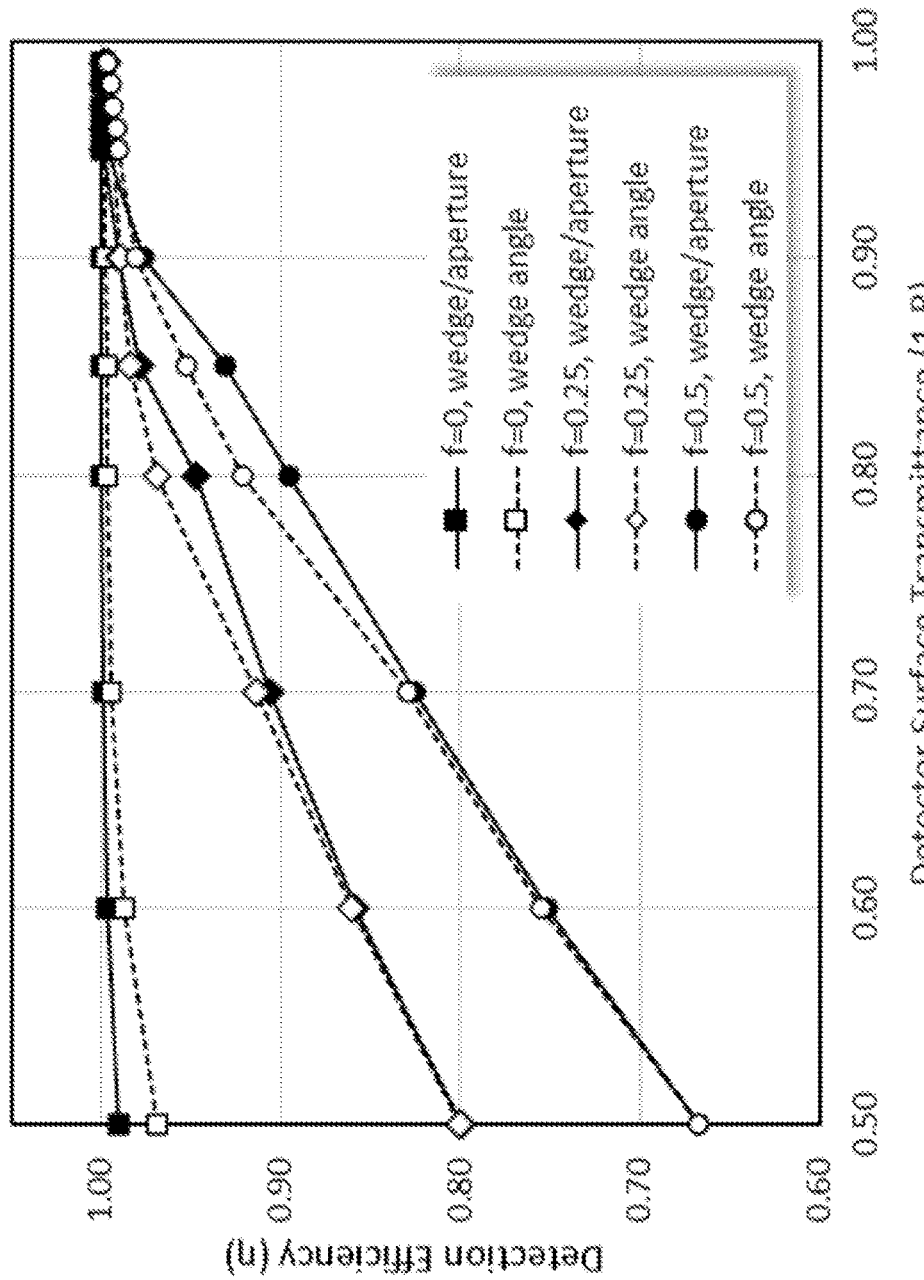
FIG. 13 is a graph depicting detection efficiencies of an electromagnetic wave-trapping device having two detectors and with a circular aperture placed in front of an opening of the device to optically affect the electromagnetic wave-trapping device.

FIG. 11 depicts an electromagnetic wave-trapping device including a circular aperture 38 placed in front of the opening to affect the incident electromagnetic ray. FIG. 12 is a table depicting detection efficiencies of an electromagnetic wave-trapping device having two detectors and with a circular aperture placed in front of or outside of an opening 24 of the device to optically affect the electromagnetic wave-trapping device. FIG. 13 is a graph depicting detection efficiencies of an electromagnetic wave-trapping device having two detectors and with a circular aperture placed in front of an opening of the device to optically affect the electromagnetic wave-trapping device. In some applications, further Improvements in detection efficiency can be improved using small apertures. In these embodiments, the front rectangular opening is much larger than the incident beam size of the incoming electromagnetic wave. Light rays may be further trapped inside the wedge-shaped structure if a small entrance aperture. This is useful for some applications where the detection of a focused light beam or a pencil laser beam using a small aperture is important, e.g., in the areas of fiber optic sensing and optical telecommunication. As an example, a 0.1 mm circular aperture is applied on the front open face of a wedge-shaped structure. In an example simulation of the detection efficiency, a detector size of 1 mm×1 mm is used and the inside aperture is coated using a reflective Aluminum coating. The structure acts as an optical integrating device, much like an integrating sphere. However, due to the reduced idle bouncing process of light rays in the wedge-shaped structures, the light trapping and detection using the present device are much more effective and efficient compared to other shapes of structures for light trapping, including spheres, hemispheres, cylinders or cubes. It shall be appreciated that circular apertures may also be used to control the incident rays upon detection surfaces shown in FIGS. 3 and 4.

Simulation results with two detectors and a front-disposed circular aperture are shown in FIGS. 12 and 13 with $\eta_{2d}$ being the detection efficiency using two bare detectors placed with the same wedge angle, $\eta_{2dwa}$ being the detection efficiency using two detectors attached in a wedge-shaped structure with a small circle aperture and f being the scatter fraction of detector surface using the scatter model of Lambertian. In cases where f=0 or 1−R>0.95, the simulation shows the detection efficiency is visibly improved when using a small aperture on the front face. However, the overall improvement is insignificant, indicating the light can be trapped very efficiently in the wedge geometry even with a large open aperture especially when two detectors are either placed at a wedge angle or in a wedge-shaped structure. This finding is significant as the large opening of the device is critically important for many practical applications. The efficiency can be over 99% even with detectors that have 50% detection efficiency. For a good detector, e.g., with 80-90% detection efficiency, the detection efficiency of a present device using a small aperture can be improved to over 99.95%. Therefore, it can be seen that the light collection efficiency and the detectors' efficiency can be significantly improved using a wedge-shaped structure. The detection efficiency can be close to unity (near 100%) by using the present device. The present device also allows broad band collection and detection of any electromagnetic wave bands. By comparing to other optical structures or cavities for light detection, the wedge-shaped design can greatly increase the probability that the rays hit the detector surface, i.e., by reducing the idle bouncing of light rays on the detector surfaces. The design has a relatively large entrance aperture while allowing the light rays to be trapped efficiently. Due to the unique design of wedge-shaped structure, large fill factor and high spatial resolution can be obtained, which are critical for applications of imaging sensors and solar energy collection. The present device can also be sized depending on the desired detector size, number of detectors and applications.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An electromagnetic wave-trapping device comprising:
   (a) a pair of spaced-apart first walls disposed substantially in parallel format, each said first wall comprising a front end and a rear end;
   (b) a second wall extending from said rear end of a first of said pair of first walls at a first lateral angle with respect to said first of said pair of first walls between said pair of first walls; and
   (c) a third wall extending from said rear end of a second of said pair of first walls at a second lateral angle with respect to said second of said pair of first walls between said pair of first walls,
   wherein electromagnetic rays are received at least in one of a space between said second wall and said first of said pair of first walls and a space between said third wall and said second of said pair of first walls.

2. The electromagnetic wave-trapping device of claim 1, said first lateral angle is substantially the same as said second lateral angle.

3. The electromagnetic wave-trapping device of claim 1, wherein each of said pair of first walls, said second wall and said third wall is configured to be coated with a material selected from the group consisting of aluminum, silver, copper, gold, dielectric materials, any reflective coatings and any combinations thereof.

4. The electromagnetic wave-trapping device of claim 1, wherein each of said pair of first walls, said second wall and said third wall is flat.

5. The electromagnetic wave-trapping device of claim 1, wherein the incident electromagnetic ray is a ray selected from the group consisting of radio waves, microwaves, infrared light, visible light, ultraviolet light and X-rays.

6. The electromagnetic wave-trapping device of claim 1, further comprising at least one electromagnetic wave detector disposed on one of said pair of first walls, said second wall and said third wall for detecting at least a portion of the incident electromagnetic ray.

7. The electromagnetic wave-trapping device of claim 1, further comprising a circular aperture configured to be placed in front of said front end of said pair of first walls to affect the incident electromagnetic ray.

\* \* \* \* \*